United States Patent [19]

Brand

[11] Patent Number: 4,769,534
[45] Date of Patent: Sep. 6, 1988

[54] OPTICAL DETECTOR WITH STORAGE EFFECTS REDUCTION

[75] Inventor: Donald L. Brand, Bend, Oreg.

[73] Assignee: Tektronix, Inc., Beaverton, Oreg.

[21] Appl. No.: 931,491

[22] Filed: Nov. 17, 1986

[51] Int. Cl.⁴ ............................................. H01J 40/14
[52] U.S. Cl. ............................................... 250/214 R
[58] Field of Search ............... 250/213 VT, 216, 207, 250/214 R; 350/356, 355; 354/227.1

[56] References Cited

U.S. PATENT DOCUMENTS

| | | | |
|---|---|---|---|
| 3,980,880 | 9/1976 | D'Agostino | 250/213 VT |
| 4,226,529 | 10/1980 | French | 250/213 VT |
| 4,327,285 | 4/1982 | Bradley | 250/213 VT |
| 4,461,572 | 7/1984 | Tsuchiya | 250/213 VT |
| 4,504,921 | 3/1985 | Nasuta et al. | 350/356 |
| 4,591,253 | 5/1986 | Hecker et al. | 354/227.1 |

*Primary Examiner*—David C. Nelms
*Assistant Examiner*—Michael Messinger
*Attorney, Agent, or Firm*—Francis I. Gray

[57] ABSTRACT

Optical detector storage effects reduction is achieved by inserting an optical modulator between the optical signal to be measured and the optical detector. The modulator is normally turned off, and is only turned on during the period when the output of the optical detector is being sampled by a sampling system.

4 Claims, 2 Drawing Sheets

OPTICAL DETECTOR WITH STORAGE EFFECTS REDUCTION

BACKGROUND OF THE INVENTION

The present invention relates to optical detectors, and more particularly to a method for reducing the optical detector storage effects of a high speed optical measuring system.

High speed optical signals are commonly measured by applying the signal continuously to an optical detector and sampling the detector output signal with an electronic sampling system. Such a system is used in the OF150 Series of Fiber Optic Time Domain Reflectometers manufactured by Tektronix, Inc. of Beaverton, Oregon. Assuming a pulsed input, the output of the detector at the trailing edge of the input pulse is in the form of an exponential decay due to the storage time of the detector. A sample strobe applied to the sampling system from a timing control during the decay portion of the detector output will result in a sample output which has a significant error from the actual value of the input pulse. What is desired is a method for reducing the effects of the storage time of the detector to produce a more accurate value at the output.

SUMMARY OF THE INVENTION

Accordingly the present invention provides an optical detector storage effects reduction method by using an optical modulator device to refine and improve the performance of the optical detector. An input optical signal is input to the optical modulator which is turned off prior to the sample time, preventing light from reaching the optical detector. The modulator is then turned on just before or concurrent with the beginning of a sample strobe. Thus the optical signal is prevented from reaching the detector and creating storage effects that may distort the electrical output signal during the sampling time.

The objects, advantages and other novel features of the present invention are apparent from the following detailed description when read in conjunction with the appended claims and attached drawing.

DESCRIPTION OF THE PREFERRED EMBODIMENTS

Figure 1A:
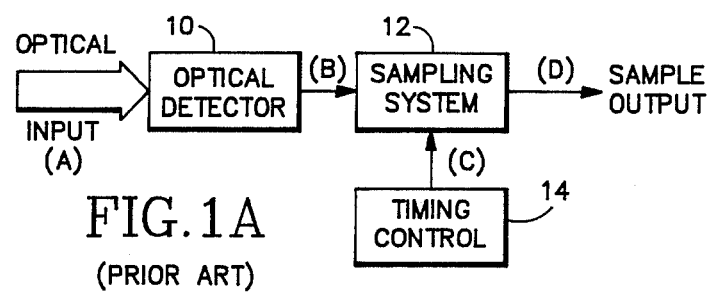
FIG. 1A is a block diagram of a prior art optical measurement system.
Figure 1B:
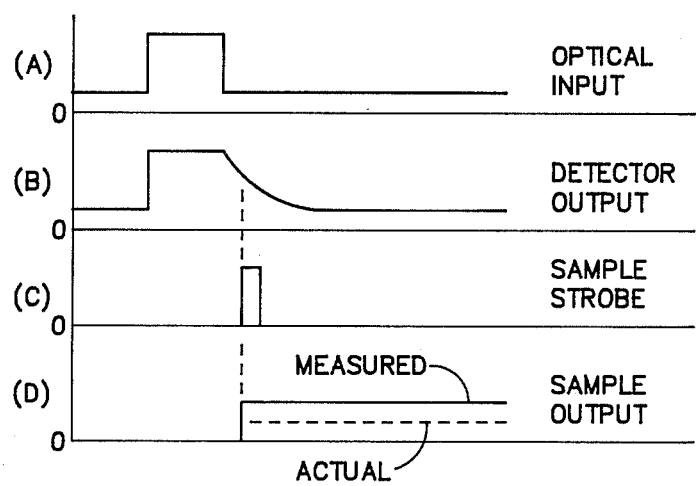
FIG. 1B is a timing diagram for the prior art optical measurement system of FIG. 1A.

Referring now to FIGS. 1A and 1B a prior art optical measurement system has an optical detector 10 to which is input an optical signal, indicated by (A). The output of the optical detector, indicated by (B), is input to a sampling system 12. The sampling system 12 samples the output of the optical detector when triggered by a strobe pulse, indicated by (C), from a timing control circuit 14. The resulting output from the sampling system 12 is indicated by (D), showing that there is an error in the measurement value as opposed to the actual value of the optical signal at the sampling time.

Figure 2A:
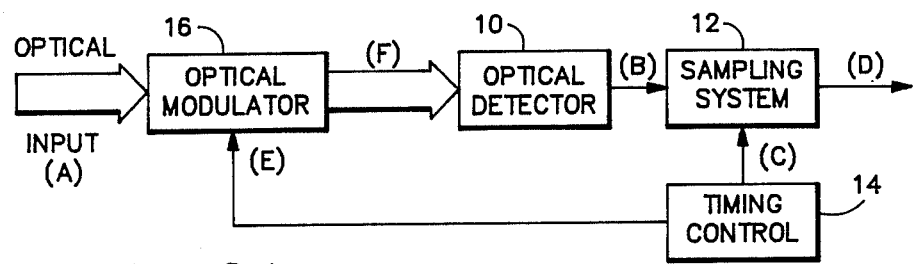
FIG. 2A is a block diagram of a high speed optical measurement system according to the present invention.
Figure 2B:
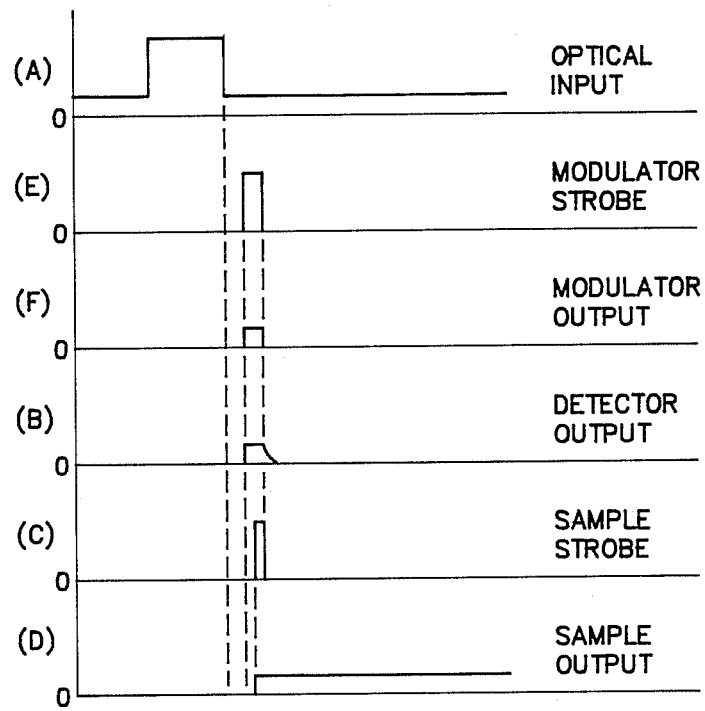
FIG. 2B is a timing diagram for the optical measurement system of FIG. 2B.

FIGS. 2A and 2B show an optical measurement system having an optical modulator 16 inserted prior to the optical detector 10. The output of the optical modulator 16, indicated by (F), is then input to the optical detector 10, the output of which is sampled by the sampling system 14 as in the prior art. The optical modulator 16 is turned off prior to the sample strobe from the timing control circuit 14. Just prior to, or concurrent with, the generation of the sample strobe from the timing control circuit 14, the timing control circuit 14 applies a modulator strobe pulse, as indicated by (E), to the optical modulator 16 to turn on the modulator and pass a portion (F) of the optical signal (A) to the optical detector 10. The sample strobe (C) samples the optical detector output (B) to produce the sample output (D) which now represents the actual value of the optical input (A) at the sample time.

For multiple samples the interval between samples, i.e., between optical modulator turn on times, is determined by the time required to allow the storage effects of the optical detector 10 to decay. Also the turn on time of the optical modulator is kept as short as possible, i.e., the turn on time is only as long as the sampling system 12 requires to obtain the sample. Therefore if the storage effects decay time for the maximum value of the optical input signal is 100 nsecs, then the optical signal may be sampled at a 10 MHz rate.

Thus, the present invention provides a means for improving the performance of high speed optical measurement systems by decreasing the effects of optical detector storage time through the use of an optical modulator at the input of the optical detector, the optical modulator being turned on only during the sample time.

What is claimed is:

1. An improved optical measurement system of the type having an optical detector to which an optical signal to be measured is input, the output of the optical detector being sampled by a sampling system, wherein the improvement comprises means for inhibiting the input of an optical signal to the optical detector except during the time when the output of the optical detector is being sampled by the sampling system.

2. An improved optical measurement system as recited in claim 1 wherein the inhibiting means comprises:
   an optical modulator having the optical signal as an input and outputting a modulated optical signal for input to the optical detector; and
   means for turning on the optical modulator only during the time when the output of the optical detector is being sampled by the sampling system.

3. An improved optical measurement system as recited in claim 2 wherein the turning on means comprises a timing control circuit which generates a sample strobe for the sampling system to sample the output of the optical detector and a modulator strobe for turning on the optical modulator, the modulator strobe being approximately concurrent with the sample strobe and having a pulse width greater than or equal to that of the sample strobe.

4. An improved optical measurement system as recited in claim 3 wherein the timing control circuit outputs a plurality of sample and modulator strobes at a rate determined by the storage effects decay time of the optical detector such that samples are obtained in the absence of the storage effects.

* * * * *

UNITED STATES PATENT AND TRADEMARK OFFICE
CERTIFICATE OF CORRECTION

PATENT NO. : 4,769,534

DATED : September 6, 1988

INVENTOR(S) : Donald L. Brand

It is certified that error appears in the above-identified patent and that said Letters Patent is hereby corrected as shown below:

Claim 1, Line 4 (Column 2, Line 40.)
Insert after detector "having a storage effects decay time and"

Claim 1, Line 4 (Column 2, Line 40.)
Insert after sampling system "to produce a sample output,"

Claim 1, Line 8 (Column 2, Line 44)
Insert after sampling system "such that the effect of the storage effects decay time in the sample output is reduced."

Signed and Sealed this

Eighth Day of May, 1990

Attest:

HARRY F. MANBECK, JR.

Attesting Officer

Commissioner of Patents and Trademarks